April 20, 1965  E. L. J. G. SCHAAR  3,178,859
INCLINED BILLET GRINDER
Filed April 9, 1963  5 Sheets-Sheet 3
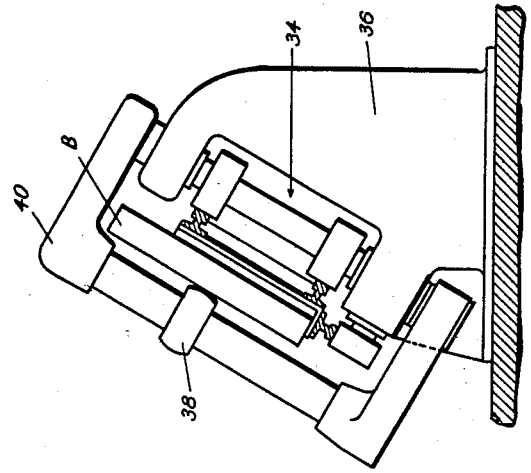
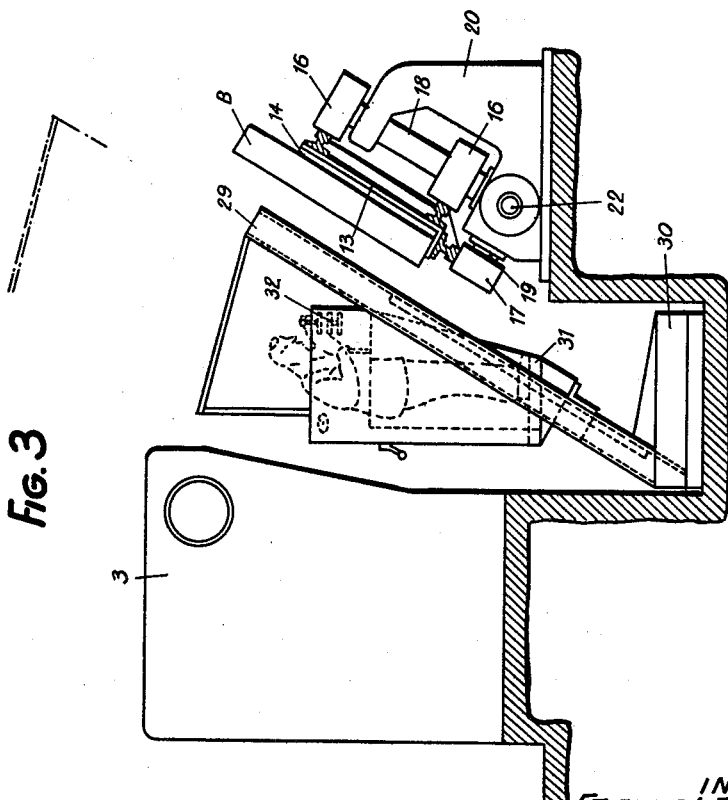
INVENTOR
ETIENNE L.J.G. SCHAAR
BY Allan R Redrow
ATTORNEY

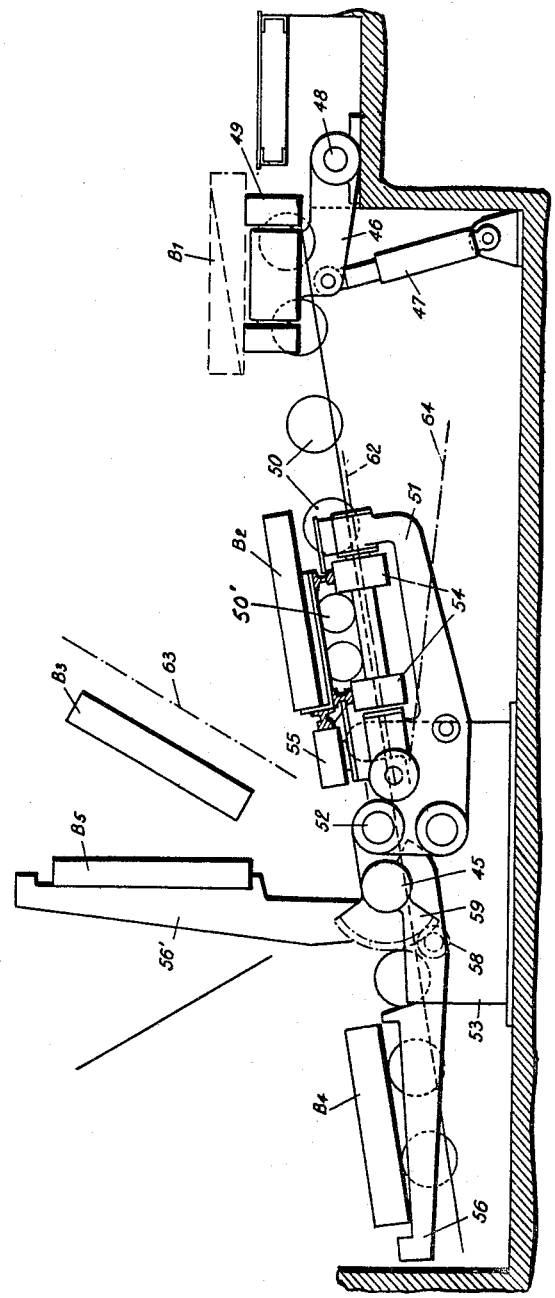

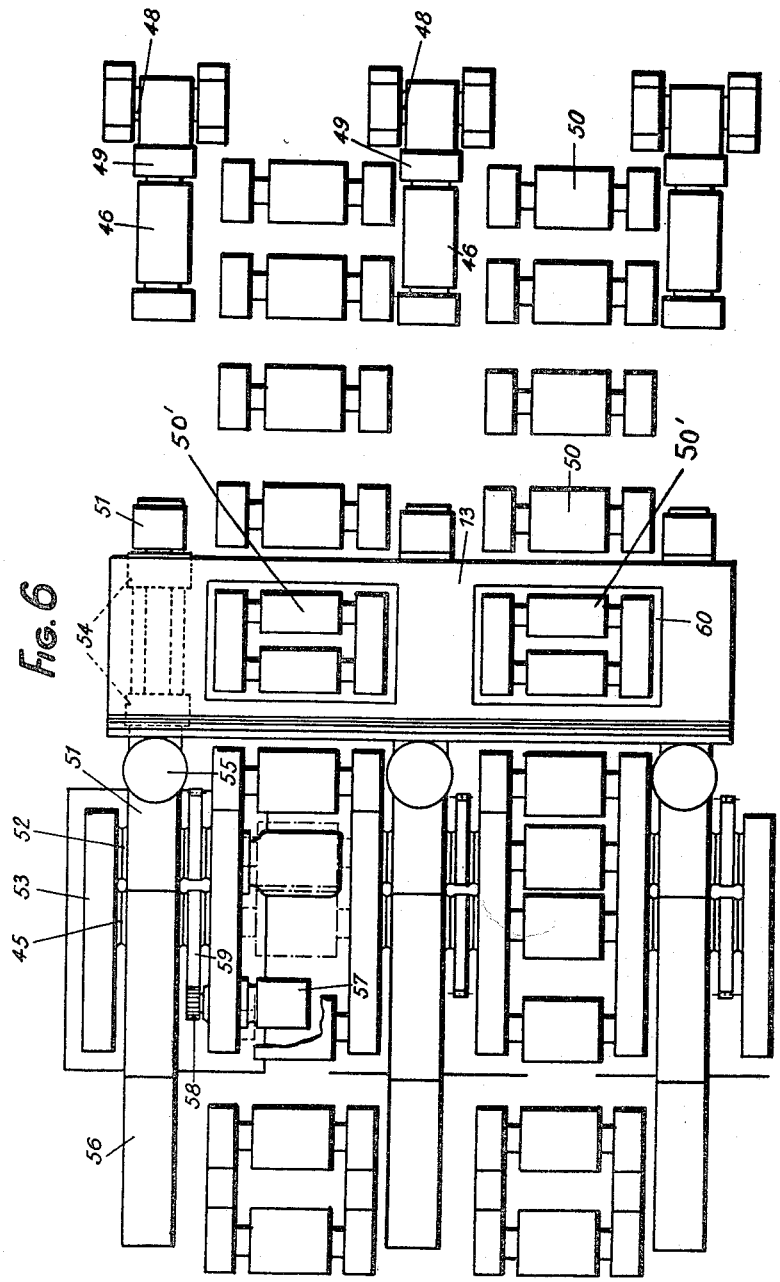

3,178,859
INCLINED BILLET GRINDER
Etienne L. J. G. Schaar, Marly-le-Roi, France, assignor to Norton Company, Worcester, Mass., a corporation of Massachusetts
Filed Apr. 9, 1963, Ser. No. 271,719
12 Claims. (Cl. 51—45)

This invention relates generally to a machine for snagging massive slabs, and more particularly to a semi-automatic machine for snagging scale, imperfections and cracks out of one or more faces of a rectangular slab. The invention is characterized by the provision of improved means for movably supporting and transporting a slab relative to a movable grinding tool during a snagging grinding operation, and handling means for turning the slab to effect sequential machining of selected faces thereof.

Machines have been proposed in the prior art for snagging the surfaces for large slabs. (The term "snagging" is used to identify a coarse, heavy-pressure surface grinding operation for removing imperfections prior to performance of subsequent metal finishing procedures.) Because of the extremely large size and masses of the slabs currently treated in the metal working art, the handling of the slabs, and the support thereof during the machining operation, present serious problems. When plural faces of a slab are to be machined by a single grinding tool, turning of the slab is required after each of the face grinding operations. The time required for both grinding and handling procedures is relatively lengthy, thus increasing the cost of the machining operation. Furthermore, the known machines generally make use of travelling cranes or the like for lifting and carrying the slabs. Since these cranes are normally in continuous use in a metal working plant, quite often a crane is unavailable when the slab is to be rotated for the machining of another face, or when a slab is to be transported to or from a snagging station. This time spent in waiting for the auxiliary handling apparatus further increases production costs.

In view of the above and other drawbacks, the known machines for snagging large slabs have proved to be generally unsatisfactory. The present invention was developed to circumvent the disadvantages of the known snagging machines.

An object of the present invention is to provide an improved snagging machine including slab-handling means for effecting successive machining of selected faces of a slab. The machining of selected slab faces is accomplished without the use of any type of auxiliary handling equipment, and consequently the time required for, and the resultant cost of, the snagging operations are greatly reduced.

Another object of the invention is to produce a snagging machine which requires a minimum amount of turning and handling of the slab. In accordance with a more specific feature of the invention, supervisory station means are provided for permitting close observation of the work surface being machined. These supervisory station means present the advantage that the work is continuously inspected prior to removal from the grinding station, whereby the necessity for reintroduction of the work to the grinding means, which is quite common in conventional snagging apparatus, is avoided.

A further object of the invention is to provide improved means for supporting a slab for coplanar transport without slippage relative to the movable grinding means, said slab being maintained in an inclined position by the transport means, whereby interference with the grinding operation by the swarf and debris produced during grinding is eliminated.

A further object of the invention is to provide improved means for controlling the snagging or grinding pressure comprising linkage means carrying a continuously driven grinding wheel, the linkage being operated by hydraulic motor means or the like to cause the tool to sweep generally vertically or transversely across the exposed surface of the traveling work.

Other objects and advantages of the invention will become apparent from a study of the following specifications when considered in conjunction with the accompanying drawing, in which.

Figure 2:
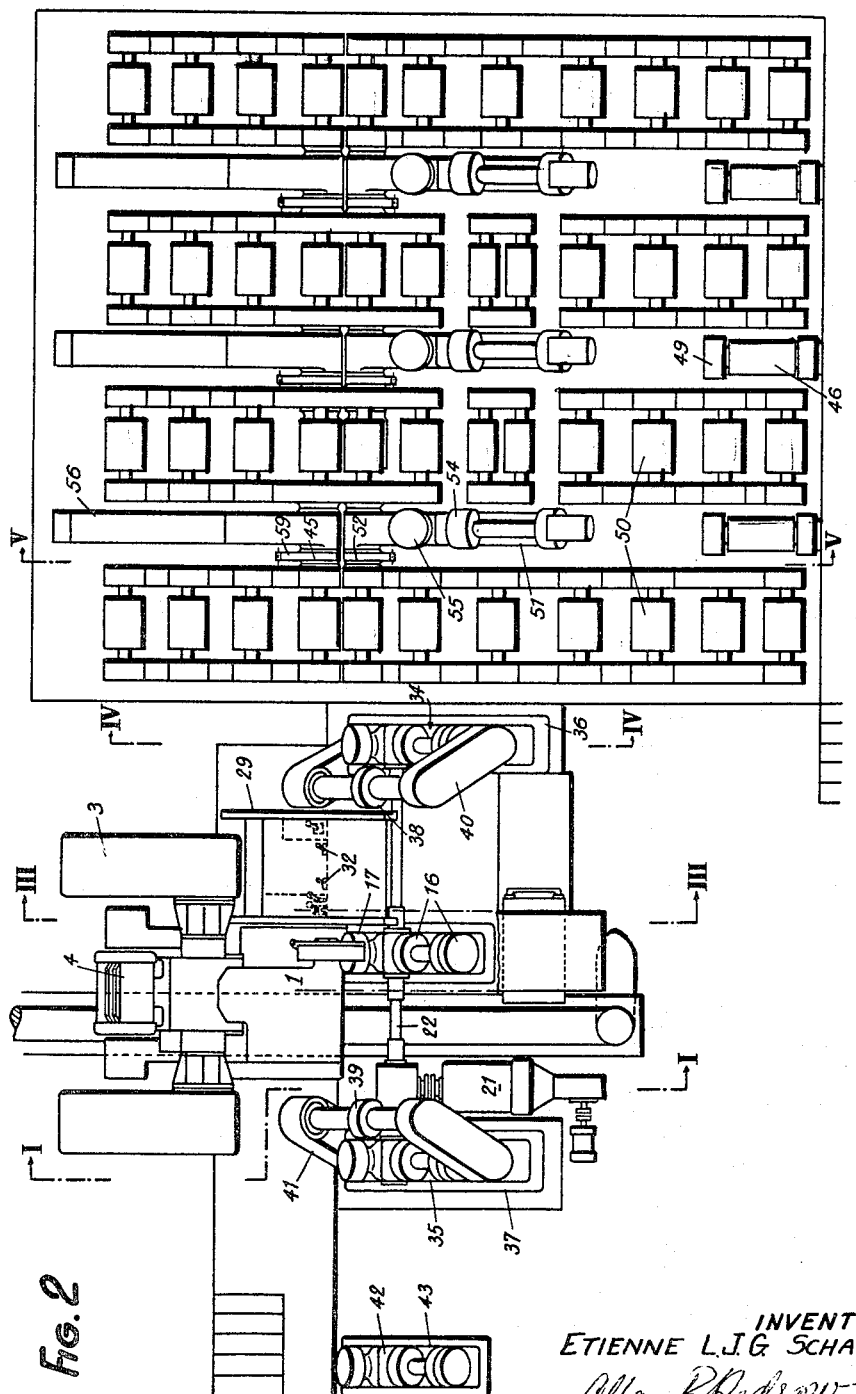
FIG. 2 is a plan view of the snagging machine illustrating the relative locations of the grinding, supervisory and slab handling means.

FIG. 3, which is a sectional view taken along line III—III of FIG. 2, illustrates the supervisory station;

FIG. 4 is a sectional view taken along line IV—IV of FIG. 2 and illustrates the upper roller means for pressing the slab against the table during the grinding operation;

FIG. 5 is a sectional view taken along line V—V of FIG. 2 and illustrates the slab handling station; and FIG. 6 is a plan view of the slab handling station of FIG. 5.

The snagging machine includes a grinding station having a partially-enclosed grinding wheel adapted to sweep generally vertically across the exposed face and horizontally across the exposed edge of a horizontally moving inclined slab. The slab is supported, by its lower edge face and by one of its major faces, upon an inclined table having an L-shaped cross-section. Driven support roller means transport the table and slab in a horizontal co-planar direction normal to a vertical plane containing the grinding tool. Handling means are provided for receiving a slab from a supply source thereof, feeding the slab to the grinding station to produce machining of a first slab face and edge, removing the partially machined slab, turning the slab, again feeding the slab to the grinding station for the machining of a second slab face and edge, and then removing the completely machined slab.

In accordance with the invention hydraulic motor means control the movement of the grinding wheel and its pressure against the work, and this motor means acts upon an intermediate control arm of the linkage which is angularly adjustable relative to the arm carrying the grinding wheel. Reduction gear means or the like are provided for angularly adjusting this control arm between fixed positions relative to the wheel-carrying arm to vary the grinding pressure applied to the work.

In order to compensate for unevenness in the supported surface of the slab, a deformable liner is interposed between the generally L-shaped support table and the adjacent major face of the slab. This deformable liner provides a supporting surface adapted to oppose the grinding force uniformly as the grinding wheel is moved across the exposed surface of the slab. According to another feature of the invention, upper driven roller means supported on movable arms are provided for engaging the exposed slab face being machined to maintain the slab and table against the driven support rollers during grinding.

As indicated above, the inclined table has an L-shaped cross-section and supports the lower side surface and the surface opposite to the grinding station, the slab being held in an inclined position, the other faces of the slab being exposed. Preferably, the slab is so supported by the table and the driven support rollers that the principal exposed slab face opposite the grinding station is arranged at an angle of approximately 60° relative to the horizontal.

The supervisory or grinding station means referred to above includes an operator-supporting cab mounted for generally vertical movement along an inclined path adjacent the principal exposed slab face. The supervisory cab is provided with manual control means for controlling the grinding and handling means. The handling means include an inclined roller train which transports a slab from a supply position to a position opposite the grinding station. Pivoted arm means are provided adjacent the roller train for elevating the slab to an inclined position by which it is fed to and from the grinding station. These arm means are also operable to turn the slab to expose a fresh slab face to the grinding means. The operation of these handling means is effected by conventional power means, for example, electric motor or hydraulic power means, and the drive of the rollers is achieved by one or more electric motors (not shown).

Figure 1:
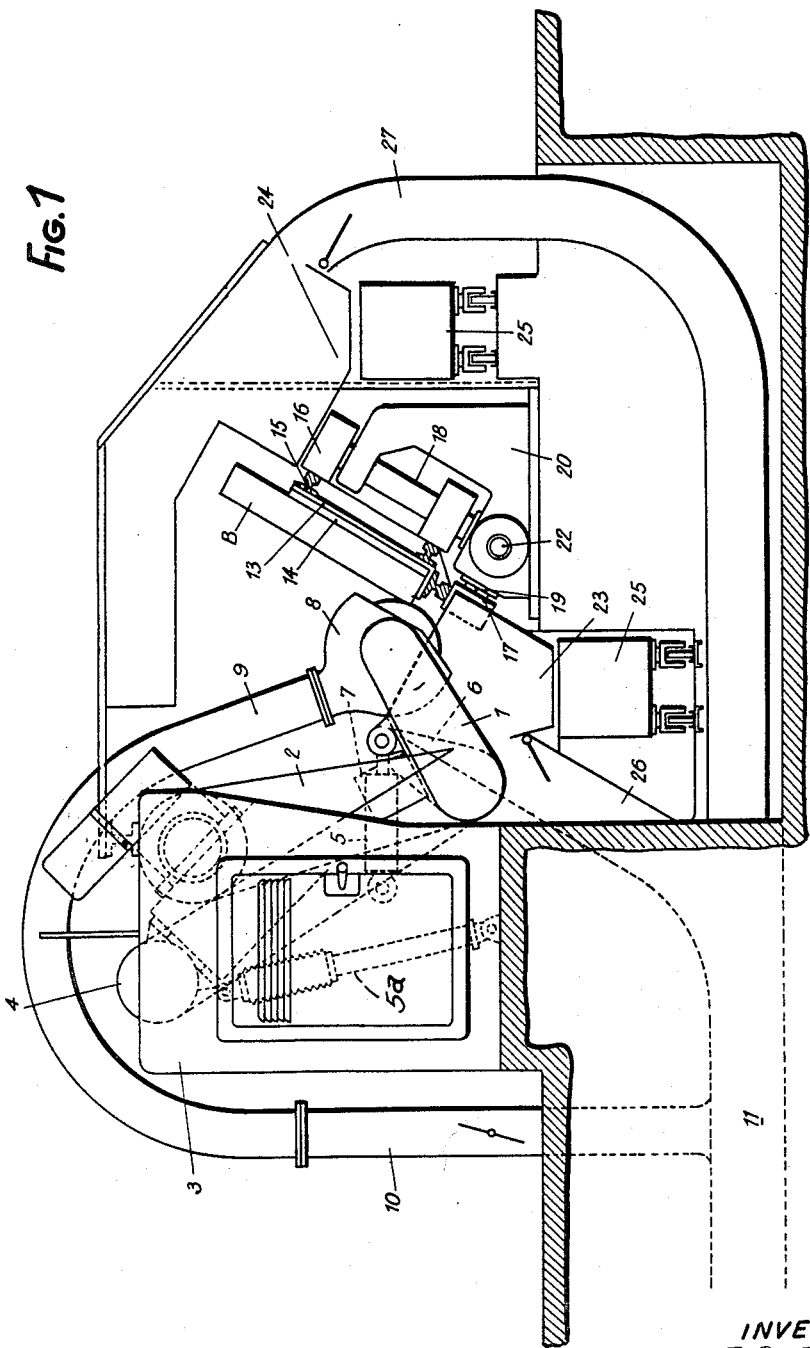
FIG. 1 is an end elevation partly broken away and illustrates the grinding station of the machine taken approximately on line I—I of FIG. 2.

Referring to FIG. 1, the rotary grinding tool is carried at the free end of a linkage including first and second arms 1 and 2, respectively. Arm 2 is pivotally connected at its upper end between fixed supports 3. Electric motor 4 mounted on arm 2 drives the grinding tool by belt means, not shown, contained within arms 1 and 2. Such articulated linkage means for supporting and driving a rotary tool relative to the work are generally known in the art, and consequently a more detailed description is believed to be unnecessary. The linkage further includes a third arm 6 which is angularly adjustable relative to first arm 1. The hydraulic motor or jack 5a is pivotally connected at one end with fixed supports 3 and at the other end with arm 2 and the hydraulic motor or jack 5 is connected at one end with arm 2 and at the other end with arm 1 respectively in a manner to operate the linkage to move the grinding wheel angularly across the length of the principal exposed surface of slab B as will be explained below. In accordance with an important feature of the invention, means 7 (for example, reduction gear or motor means) are provided for varying the angular relationship between arms 1 and 6 to adjust the grinding pressure applied by the tool to the work surface when grinding the exposed edge of the slab. A guard and exhaust hood 8 partially enclose the rotary tool and communicate with suction passage 11, via flexible conduit 9 and stationary conduit 10, to remove the chips and other particles produced during snagging.

As shown in FIG. 1, the slab B is supported by a table 13 having a generally L-shaped cross-sectional configuration. Table 13 is supported by rails 15 and driven rollers 16 and 17 at an inclination of approximately 60° relative to the horizontal, and consequently the slab B rests on one of its major surfaces and its lower side surface. The remaining surfaces of the slab are exposed. In order to compensate for depressions or unevenness in the rear surface of the slab and to uniformly support the slab during grinding, a deformable pad 14—formed of asbestos fibers, for example—is interposed between the non-exposed major surface of the slab and the table. The shafts 18 and 19 of rollers 16 and 17, respectively are driven by motor 21 (FIG. 2) via transmission shaft 22. This shaft 22 also drives roller sets 34 and 35 (FIG. 2) which are mounted in fixed frames 36 and 37, respectively. Grinding chips and other heavy particles produced during the grinding operation are collected in the casings 23 and 24 and are deposited in the rail mounted receptacles 25. For the removal of the lighter grinding particles, casings 23 and 24 are in communication with suction passage 11 by conduits 26 and 27, respectively.

It will be apparent that the rotary grinding tool is displaceable in an inclined direction along a linear path contained in a vertical plane normal to the exposed slab surface, and linear path being substantially parallel with said exposed slab surface. Consequently, the grinding tool is moved across the exposed work face as the slab and table are driven longitudinally by rollers 16, 17, 34 and 35. As motor 5 is extended, arms 1 and 2 together are extended and the grinding wheel is moved over the face of the slab exposed opposite the grinding wheel and the wheel passes up onto and also grinds the upper edge of the work. Retraction of motor 5 returns the wheel toward its FIG. 1 position. Angularly adjustable arms 2, 6 and 1 control the position of the wheel and the grinding pressure applied to the work in all of its positions as it is driven over the two surfaces of the slabs that are ground.

The grinding operation is controlled and observed by an operator at the supervisory station of FIG. 3. A pair of parallel rails 29 are rigidly supported by base 30 at an angle of inclination (approximately 60° relative to the horizontal) which corresponds with that of table 13. The operator-carrying cab 31 is vertically movable along rails 29 to permit the operator to observe at close range (for example, a distance less than one meter) the grinding operation. By means of the control devices 32 shown schematically in FIGS. 2 and 3, the operator may control the grinding operation and cab movement. It is apparent that by appropriate mechanical connection, the cab may be caused to move in synchronism with the movement of the grinding tool.

Each of the driven roller sets 34 and 35 (FIGS. 2 and 4) are supported in base member 36, 37 and each set includes pairs of rollers mounted on a first rotary shaft inclined at an angle of 60° relative to the horizontal, and another roller mounted on a second shaft having an axis arranged at right angles to the axis of the shaft for rollers 34. Consequently, the sets of rollers 16 and 34, and 17 and 35 respectively, define a support consisting of two planes arranged at an angle of 90° for uniformly supporting the inclined table 13 and rectangular slab B. The rotary motion of driven rollers 34 and 35 is transmitted to upper rollers 38 and 39 by drive chain or other suitable transmission means. The shafts of rollers 38 and 39 are carried by swinging journal supports 40 and 41 respectively, which are spaced apart so that the table and slab can move between them whereby the rollers 38 and 39 can engage and maintain slab B in engagement with table 13 during the grinding operation. Preferably, journal supports 40 and 41 are adjustable (for example, by hydraulic jack means, not shown) to permit raising of rollers 38 and 39 during insertion of the slab-carrying table upon the driven support rollers, and lowering of the rollers upon the slab. The driven rollers 38 and 39 also assist in transporting the slab relative to the grinding means. Idler rollers 42 supported by frame 43 adjacent the free end of the machine define perpendicular supporting surfaces for receiving and supporting the slab-carrying table 13 in its extreme position.

The slab feeding and handling system is shown more particularly in FIGS. 2, 5 and 6. Support arms 46, which are mounted for pivotal movement by hydraulic jacks 47 about stationary pivot 48, carry support rollers 49. The arms 46 and rollers 49 are positioned between trains of idler transfer rollers 50 having axes arranged at right angles to the axes of the rollers 49. Roller trains 50 are arranged to form a downwardly inclined path as shown in FIG. 5. Between pairs of these idler transfer trains and spaced from arms 46, are arranged the pivotally movable handling arms 51 which are mounted on pivots 52 on frame 53. Handling arms 51 carry driven support rollers 54 and 55 which are mounted on shafts disposed at right angles to the axles of rollers 50, the rollers 54 being provided for receiving the rail portions of a slab table 13. Handling arms 51 are pivotally operated by any suitable jack means (not shown) to have the action described below.

Pivotally connected to the frame 53 by pivots 45 are a second set of handling arms 56 which are pivotally operable by motor 57 (FIG. 6) pinion 58 and toothed section 59.

As shown in FIG. 6, table 13 is provided with rectangular openings 60 adapted to receive certain rollers 50' of the train of rollers 50 when arms 51 are pivoted to their extreme position in the clockwise direction as in the FIG. 5. In this manner, the table 13 may be lowered away from the slab B.

The operation of the machine thus far described is as follows:

Assume that a slab $B_1$ is supported on rollers 49 as shown in FIG. 5 and that handling arms 51 are rotated to a position to hold the top surfaces of the pad 14 below the plane of the tops of roller train 50 causing the shorter leg of the table to extend above the transporting surface of roller train 50. To bringing the slab to the grinding station of FIG. 1, jacks 47 are actuated to lower support arm 46 whereby the slab slides down the roller train 50 to engage the projecting shorter leg of table 13 and takes the position on the table illustrated by reference designation $B_2$. After the slab is positioned on the table, arm 51 is pivoted in the counter-clockwise direction to raise the table and slab slightly above the working plane of roller train 50 as shown to bring pad 14 into contact with the slab. Further counterclockwise movement of arms 51 to the position 63 will raise the slab to the position $B_3$. When the slab is elevated to this position, the table 13 and rails 15, which engage driven rollers 54 and 55, are moved into engagement with the next set of driven rollers 34, by which the table is further displaced toward the grinding station. As indicated above, the slab is then transported to the left past the grinding station in FIG. 2 by driven rollers 16, 17, 34 and 35 while being engaged by rollers 38 and 39. If desired, driven rollers 54 and 55 may be disconnected from the drive means during the subsequent grinding operation. Idler rollers 42 support the feed end of the slab as it is fed longitudinally past the grinding tool. During planar transport of the slab, the grinding tool is moved vertically across the exposed slab face and over the exposed top edge under inspection of the operator in cab 31, the operator being able to control the grinding pressure by means of the controls 32, reduction means 7, and angularly adjustable arm 6.

Upon completion of the snagging of the exposed front and top slab surfaces, the support rollers are driven in a direction to return the slab and table to the slab handling station. Arms 51 are pivoted from position 63 in FIG. 5 to position 64, whereby the slab rests upon the supporting surface of the roller train and the table 13 is lowered therebeneath (owing to the table openings 60). Since the short leg or bottom flange of table 13 is now swung into a position below the transporting surface of roller train 50, the slab moves by gravity to the position $B_4$. The slab is intercepted by upwardly extending projections on second handling arms 56, and these arms 56 are now pivoted in the clockwise direction to the position 56', whereby the slab is elevated to position $B_5$. Simultaneously the empty table and arms 51 are being pivoted in the counterclockwise direction so that the table will meet and engage with the previously machined major face of the slab. Arms 56 and 51 are pivoted together to the position indicated by dotted line 63, whereupon the arm 56 is retracted; the slab and table are driven again by rollers 54 and the other feed means to the grinding station. The other major face and edge of the slab is then machined by the rotary grinding tool as described above. Upon completion of the grinding operation, rollers 34 are again reversed to remove the slab from the grinding station and return it to the position $B_3$. The machined slab is then removed from the machine by appropriate transfer means, not shown.

It is apparent that the present invention permits successive snagging of selected slab surfaces in a semi-automatic manner. The need for auxiliary apparatus for turning the slab or for transporting the same to and from the grinding station is eliminated, and only a minimum amount of movement of the slab is required for the machining operations.

While the preferred embodiment of the invention has been illustrated and described, it will be apparent to those skilled in the art that changes may be made in the disclosed apparatus without deviating from the invention set forth in the following claims.

What is claimed is:

1. A machine having a base, said machine being adapted for snagging slabs, comprising: means supporting a slab in an inclined position with one-half of its periphery completely exposed, and grinding means for machining said exposed peripheral portion of the slab; said grinding means being movable along a linear path across said exposed peripheral portion; said support means including table means engaging only the unexposed one-half of the periphery of said slab; and roller means supporting said table means for co-planar movement in a direction normal to the linear path of travel of said grinding means.

2. Apparatus as defined in claim 1 wherein said grinding means comprises a rotatably driven grinding wheel; linkage means including a plurality of interconnected arms; said linkage having first and second arms which are connected respectively with said wheel and with said base; said linkage means including also a third arm angularly arranged and adjustably connected between said first arm and said second arm; and motor means connected between said second arm and said fixed base for operating said linkage to displace said grinding tool along said linear path.

3. Apparatus as defined in claim 2, and further including means for varying the angular relationship between said first and third arms to vary the grinding pressure used for applying the grinding wheel to the slab.

4. A machine for snagging a rectangular slab having front and back sides and top and bottom edges comprising: inclined table means from supporting the slab in an inclined position relative to the horizontal, said table means cooperating solely with the back surface of the slab and the lower edge thereof; the front and top edge surfaces of said slab being exposed; movable grinding means for machining the front and top edge of said slab; said grinding means being movable in a linear direction across said exposed slab surfaces; said linear direction being in an inclined path contained in a vertical plane; and drive roller means for moving said table means and the slab supported thereon in a horizontal direction at right angles to said plane; and means for driving said drive roller means.

5. Apparatus as defined in claim 4 wherein said drive roller means includes a first set of rollers movably supporting said table means, and a second set of rollers arranged to engage the front slab surface for maintaining the slab in engagement with said table means.

6. Apparatus as defined in claim 4 wherein said table means support said slab in an inclined position with the front slab surface arranged at an angle of approximately 60° relative to the horizontal.

7. A machine for snagging rectangular slabs comprising a table adapted to support a slab solely by one of its major surfaces and one of its side surfaces, the other surfaces of said slab being exposed; a grinding station including roller means for supporting said table in a position causing the exposed major surface of the slab to be inclined relative to the horizontal; movable grinding means for grinding said exposed slab surfaces; said grinding means being movable along a linear path across said exposed slab surfaces; and means for driving said roller means to displace said slab and table in a direction co-planar with said exposed surfaces; and transversely to the linear path of travel of said grinding means; and a supervisory station adjacent said grinding station and including operator-supporting cab means movable adjacent said exposed slab surface in a direction parallel with the linear path of travel of said grinding means.

8. Apparatus as defined in claim 7 wherein said cab means include stationary rail means inclined parallel with the major exposed surface of the slab, and said cab being mounted for movement on said rail means.

9. Apparatus as defined in claim 8 and further including means for moving said cab in synchronism with the movement of said grinding means.

10. Apparatus as defined in claim 8, and further including a slab and table handling station comprising an inclined roller train means for supporting the table and the slab carried thereby; a first pivotally movable arm means operable to maintain a table and slab at a first position on said roller train means, said first arm means being pivotable to elevate said slab and table to a second position adjacent the driven rollers at said grinding station for the transfer of said table and slab to and from said grinding station.

11. Apparatus as defined in claim 10 wherein said first arm means is pivotable to a lowered position relative to said roller train to separate the table from the slab and to permit the slab to move along said roller train to a third position; and further including a second pivotally movable arm means for engaging said slab in the third position and cooperating with said first arm means to turn the slab over relative to the table to expose the previously unexposed surfaces of the slab as it is supported on the table.

12. Apparatus as defined in claim 11, and further wherein said cab means includes control means for operating said first and second arm means and said grinding station roller means to effect machining of the exposed surfaces of the slab.

References Cited by the Examiner
UNITED STATES PATENTS

| | | | |
|---|---|---|---|
| 1,223,040 | 4/7 | Devanney | 51—240 |
| 1,551,995 | 9/25 | Lovenston | 51—240 |
| 2,139,952 | 12/38 | Giles | 51—240 |
| 2,597,246 | 5/52 | Kelly | 214—1 |
| 2,807,123 | 9/57 | Palmer | 51—34 |
| 2,819,563 | 1/58 | Lowe | 51—45 |
| 2,933,859 | 4/60 | Guinn | 51—92 |
| 2,934,219 | 4/60 | Stumpf | 214—1 |
| 3,052,067 | 9/62 | Dilks | 51—35 |

LESTER M. SWINGLE, *Primary Examiner.*

J. SPENCER OVERHOLSER, *Examiner.*